(12) United States Patent
Caldeira et al.

(10) Patent No.: US 12,496,805 B2
(45) Date of Patent: Dec. 16, 2025

(54) WORKPIECE FOR A DISPLAY ARTICLE

(71) Applicant: Visteon Global Technologies, Inc., Van Buren Township, MI (US)

(72) Inventors: Carlos Caldeira, Palmela (PT); Nelson Lima, Lisbon (PT); Hugo Cardoso, Lisbon (PT); Andre Ruza, Palmela (PT); Antonio Aires, Lisbon (PT); Andre Mendiboure, Rueil Malmaison (FR); Abhilash Marthi Somashankar, Northville, MI (US); Richard K. McMillan, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 18/892,606

(22) Filed: Sep. 23, 2024

(65) Prior Publication Data

US 2025/0010578 A1 Jan. 9, 2025

Related U.S. Application Data

(60) Continuation of application No. 18/508,218, filed on Nov. 13, 2023, now Pat. No. 12,097,691, which is a division of application No. 16/925,495, filed on Jul. 10, 2020, now Pat. No. 11,813,837.

(60) Provisional application No. 62/872,853, filed on Jul. 11, 2019.

(51) Int. Cl.
| | |
|---|---|
| B32B 7/14 | (2006.01) |
| B32B 37/12 | (2006.01) |
| C09J 5/04 | (2006.01) |
| C09J 9/00 | (2006.01) |
| G02F 1/1333 | (2006.01) |

(52) U.S. Cl.
CPC ............ *B32B 7/14* (2013.01); *B32B 37/1292* (2013.01); *C09J 5/04* (2013.01); *C09J 9/00* (2013.01); *B32B 2457/202* (2013.01); *C09J 2203/318* (2013.01); *C09J 2301/204* (2020.08); *C09J 2301/208* (2020.08); *G02F 1/1333* (2013.01); *G02F 2202/28* (2013.01)

(58) Field of Classification Search
CPC .................................................... B32B 37/003
See application file for complete search history.

*Primary Examiner* — Ian A Rummel
(74) *Attorney, Agent, or Firm* — Quinn IP Law

(57) ABSTRACT

A workpiece for a display article includes a coated first substrate including a first substrate; a liquid optically clear adhesive disposed on the first substrate in a first fill pattern; and a dam disposed on the first substrate, spaced apart from the first fill pattern, and configured to restrain a flow of the liquid optically clear adhesive. The workpiece also includes a coated second substrate adjacent the coated first substrate and including a second substrate and the liquid optically clear adhesive disposed on the second substrate in a second contact pattern.

20 Claims, 11 Drawing Sheets

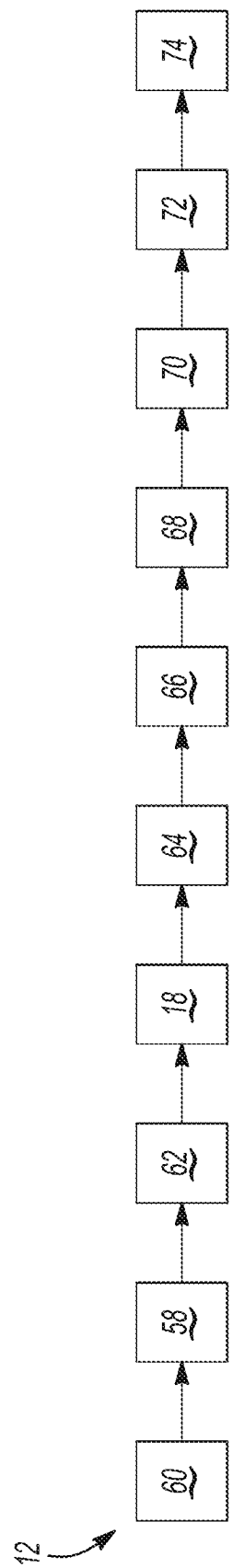

WORKPIECE FOR A DISPLAY ARTICLE

CROSS-REFERENCE TO RELATED APPLICATIONS

This application is a continuation of and claims the benefit of U.S. patent application Ser. No. 18/508,218, filed on Nov. 13, 2023, which is a divisional of U.S. patent application Ser. No. 16/925,495, filed on Jul. 10, 2020, now U.S. Pat. No. 11,813,837, issued on Nov. 14, 2023, which claims priority to and the benefit of U.S. Provisional Patent Application No. 62/872,853, filed on Jul. 11, 2019, each of which is incorporated herein by reference in its entirety.

INTRODUCTION

The disclosure relates to a method of forming a display article and to a workpiece for the display article.

Display articles, such as liquid crystal displays, may be useful for consumer electronics, computer equipment, industrial machinery controls, automobiles, and aerospace applications. Such display articles may include one or more layers bonded to one another and disposed over a liquid crystal display. For example, a protective overlay or cover lens may be useful for protecting the liquid crystal display from mechanical and environmental forces. Other layers of the display article may include touch-sensitive panels, optical filters, heaters, and electromagnetic interference shields.

A bonding layer such as a liquid optically clear adhesive may be disposed between adjacent layers of the display article.

SUMMARY

A method of forming a display article includes dispensing a dam material onto a first substrate. After dispensing, the method includes pre-curing the dam material to form a dam. The method further includes depositing a liquid optically clear adhesive in a first fill pattern onto the first substrate such that the first fill pattern is spaced apart from the dam to thereby form a coated first substrate. The method includes depositing the liquid optically clear adhesive in a second contact pattern onto a second substrate to thereby form a coated second substrate, and flipping the coated second substrate upside down. The method also includes translating the coated first substrate and the coated second substrate towards one another to eliminate an air gap defined between the coated first substrate and the coated second substrate. In addition, the method includes contacting the first fill pattern and the second contact pattern at a plurality of single points spaced apart from one another. Further, the method includes compressing the first fill pattern and the second contact pattern to eliminate the air gap and air entrained between the coated first substrate and the coated second substrate and thereby form the display article.

In one aspect, compressing may include controlling a spread of the first fill pattern and the second contact pattern along the first substrate and the second substrate.

In another aspect, compressing may include completely spreading the liquid optically clear adhesive along the first substrate and the second substrate such that the first fill pattern and the second contact pattern merge and contact the dam.

In a further aspect, the first substrate may have a top edge, a bottom edge spaced apart from the top edge, and a center disposed at a midpoint between the top edge and the bottom edge. The method may further include spreading the liquid optically clear adhesive from the center to the top edge and from the center to the bottom edge so that the liquid optically clear adhesive contacts the dam.

In yet another aspect, depositing the liquid optically clear adhesive in the first fill pattern may include ejecting the liquid optically clear adhesive onto the first substrate from a dispenser at a first flow rate. Depositing the liquid optically clear adhesive in the second contact pattern may include ejecting the liquid optically clear adhesive onto the second substrate from the dispenser at a second flow rate that is less than the first flow rate.

In an additional aspect, the method may further include bonding the first substrate and the second substrate together with the liquid optically clear adhesive.

In one aspect, the method may further include, prior to dispensing, treating the first substrate and the second substrate with plasma.

In another aspect, deposing the liquid optically clear adhesive onto the first substrate may include forming the first fill pattern that includes a first chevron having a first vertex; a second chevron spaced apart from the first chevron and having a second vertex; a linear middle segment having a first midpoint and interconnecting the first vertex and the second vertex; and a central dot portion disposed at the first midpoint.

In a further aspect, depositing the first fill pattern may include dispensing the first chevron from a top of the first chevron to a bottom of the first chevron. After dispensing the first chevron, the method may include dispensing the second chevron from a top of the second chevron to a bottom of the second chevron. After dispensing the second chevron, the method may include dispensing a first portion of the linear middle segment from the first vertex to the first midpoint. After dispensing the first portion, the method may include dispensing a second portion of the linear middle segment from the second vertex to the midpoint. After dispensing the second portion, the method may include dispensing the central dot portion at the first midpoint.

In yet another aspect, the first substrate may have a top edge and a bottom edge spaced apart from the top edge. Pre-curing the dam material may include forming the dam that includes a first dam portion disposed along the top edge; a second dam portion disposed along the top edge and spaced apart from the first dam portion to define a first gap therebetween; a third dam portion disposed along the top edge and spaced apart from the second dam portion to define a second gap therebetween; a fourth dam portion disposed along the top edge and spaced apart from the third dam portion to define a third gap therebetween; a fourth dam portion disposed along the bottom edge and spaced opposite the first dam portion; a fifth dam portion disposed along the bottom edge and spaced opposite the first dam portion; a sixth dam portion disposed along the bottom edge, spaced opposite the second dam portion, and spaced apart from the fifth dam portion to define a fourth gap therebetween; a seventh dam portion disposed along the bottom edge, spaced opposite the third dam portion, and spaced apart from the sixth dam portion to define a fifth gap therebetween; and an eighth dam portion disposed along the bottom edge, spaced opposite the fourth dam portion, and spaced apart from the seventh dam portion to define a sixth gap therebetween.

In an additional aspect, depositing the liquid optically clear adhesive onto the second substrate may include forming the second contact pattern that may include a third chevron including a first linear segment having a first end, and a second linear segment having a second end and connected to the first linear segment at a third vertex. The second contact pattern may also include a fourth chevron including a third linear segment having a third end, and a fourth linear segment having a fourth end and connected to the third linear segment at a fourth vertex. The second contact pattern may also include a centerline portion having a second midpoint and interconnecting the third vertex and the fourth vertex; a first dot portion disposed at the first end; a second dot portion disposed at the second end; a third dot portion disposed at the third end; a fourth dot portion disposed at the fourth end; a fifth dot portion disposed at the third vertex; a sixth dot portion disposed at the fourth vertex; and a middle dot portion disposed at the second midpoint.

In one aspect, depositing the second contact pattern may include dispensing the third chevron from a top of the third chevron to a bottom of the third chevron. After dispensing the third chevron, the method may include dispensing the fourth chevron from a top of the fourth chevron to a bottom of the fourth chevron. After dispensing the fourth chevron, the method may include dispensing a first part of the centerline portion from the third vertex to the second midpoint. After dispensing the first part, the method may include dispensing a second part of the centerline portion from the fourth vertex to the second midpoint. After dispensing the second part, the method may include dispensing the middle dot portion at the second midpoint.

In another aspect, depositing the second contact pattern may further include dispensing the third chevron from a top of the third chevron to a bottom of the third chevron from a dispenser at a first dispenser speed. Prior to dispensing the third chevron, the method may include dispensing the first dot portion from the dispenser at a second dispenser speed that is lower than the first dispenser speed. After dispensing the first dot portion, the method may include dispensing a top line portion of the third chevron from the dispenser at the first dispenser speed. After dispensing the top line portion, the method may include dispensing the second dot portion at the third vertex from the dispenser at the second dispenser speed. After dispensing the second dot portion, the method may include dispensing a bottom line portion of the third chevron from the dispenser at the first dispenser speed. After dispensing the bottom line portion, the method may include dispensing the third dot portion from the dispenser at the second dispenser speed. After dispensing the third dot portion, the method may include dispensing the fourth dot portion from the dispenser at the second dispenser speed. After dispensing the fourth dot portion, the method may include dispensing the third linear segment of the fourth chevron from the dispenser at the first dispenser speed. After dispensing the third linear segment, the method may include dispensing the fifth dot portion at the fourth vertex from the dispenser at the second dispenser speed. After dispensing the fifth dot portion, the method may include dispensing the fourth linear segment of the fourth chevron from the dispenser at the first dispenser speed. After dispensing the fourth linear segment, the method may include dispensing the sixth dot portion from the dispenser at the second dispenser speed. After dispensing the sixth dot portion, the method may include dispensing the first part of the centerline portion from the third vertex to the second midpoint from the dispenser at the first dispenser speed. After dispensing the first part, the method may include dispensing the second part of the centerline portion from the fourth vertex to the second midpoint from the dispenser at the first dispenser speed. After dispensing the second part, the method may include dispensing the middle dot portion at the second midpoint from the dispenser at the second dispenser speed.

In a further aspect, translating may draw the coated first substrate and the coated second substrate together at a variable speed such that the coated first substrate and the coated second substrate remain parallel to one another.

In yet another aspect, compressing may include curing the dam.

A workpiece for a display article includes a coated first substrate that includes a first substrate having a top edge and a bottom edge spaced apart from the top edge, and a liquid optically clear adhesive disposed on the first substrate in a first fill pattern. The first fill pattern includes a first chevron having a first vertex; a second chevron spaced apart from the first chevron and having a second vertex; a linear middle segment having a first midpoint and interconnecting the first vertex and the second vertex; and a central dot portion disposed at the first midpoint. The coated first substrate also includes a dam disposed on the first substrate and spaced apart from the first fill pattern. The dam includes a first dam portion disposed along the top edge; a second dam portion disposed along the top edge and spaced apart from the first dam portion to define a first gap therebetween; a third dam portion disposed along the top edge and spaced apart from the second dam portion to define a second gap therebetween; a fourth dam portion disposed along the top edge and spaced apart from the third dam portion to define a third gap therebetween; a fifth dam portion disposed along the bottom edge and spaced opposite the first dam portion; a sixth dam portion disposed along the bottom edge, spaced opposite the second dam portion, and spaced apart from the fifth dam portion to define a fourth gap therebetween; a seventh dam portion disposed along the bottom edge, spaced opposite the third dam portion, and spaced apart from the sixth dam portion to define a fifth gap therebetween; and an eighth dam portion disposed along the bottom edge, spaced opposite the fourth dam portion, and spaced apart from the seventh dam portion to define a sixth gap therebetween. The workpiece also includes a coated second substrate spaced apart from and facing the coated first substrate to define an air gap therebetween. The coated second substrate includes a second substrate, and the liquid optically clear adhesive disposed on the second substrate in a second contact pattern. The second contact pattern includes a third chevron including a first linear segment having a first end; and a second linear segment having a second end and connected to the first linear segment at a third vertex. The second contact pattern also includes a fourth chevron including a third linear segment having a third end; and a fourth linear segment having a fourth end and connected to the third linear segment at a fourth vertex. The second contact pattern also includes a centerline portion having a second midpoint and interconnecting the third vertex and the fourth vertex; a first dot portion disposed at the first end; a second dot portion disposed at the second end; a third dot portion disposed at the third end; a fourth dot portion disposed at the fourth end; a fifth dot portion disposed at the third vertex; a sixth dot portion disposed at the fourth vertex; and a middle dot portion disposed at the second midpoint.

In one aspect, the first chevron may have a first width; the second chevron may have a second width that is equal to the first width; the linear middle segment may have a third width that is equal to the first width and the second width; and the central dot portion may have a diameter that is greater than the third width.

In another aspect, the first chevron may have a first height, and the second chevron may have a second height that is equal to the first height. The linear middle segment may have a third height that is greater than the first height, and the central dot portion may have a fourth height that is greater than the third height. Further, the third chevron may have a third height at the third vertex, and the fourth chevron may have a fourth height at the fourth vertex that is equal to the third height. In addition, the centerline portion may have a fifth height that is equal to the third height and the fourth height. Each of the first dot portion, the second dot portion, the third dot portion, the fourth dot portion, the fifth dot portion, the sixth dot portion, and the middle dot portion may have a height that is greater than the fifth height.

In a further aspect, the first gap may have a first gap width, the third gap may have a third gap width that is equal to the first gap width, and the second gap may have a second gap width that is less than the first gap width. The fourth gap may have a fourth gap width, the sixth gap may have a sixth gap width that is equal to the fourth gap width, and the fifth gap may have a fifth gap width that is less than the fourth gap width. Further, the first gap width may be equal to the fourth gap width, and the second gap width may be equal to the fifth gap width. In addition, the first dam portion, the second dam portion, the third dam portion, the fourth dam portion, the fifth dam portion, the sixth dam portion, the seventh dam portion, and the eighth dam portion may have an equal length.

In yet another aspect, the first chevron may be aligned with the third chevron, the linear middle segment may be aligned with the centerline portion, and the second chevron may be aligned with the fourth chevron.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 11 is a flowchart illustration of a method of forming the display article of FIG. 10A.

DETAILED DESCRIPTION

Figure 10A:
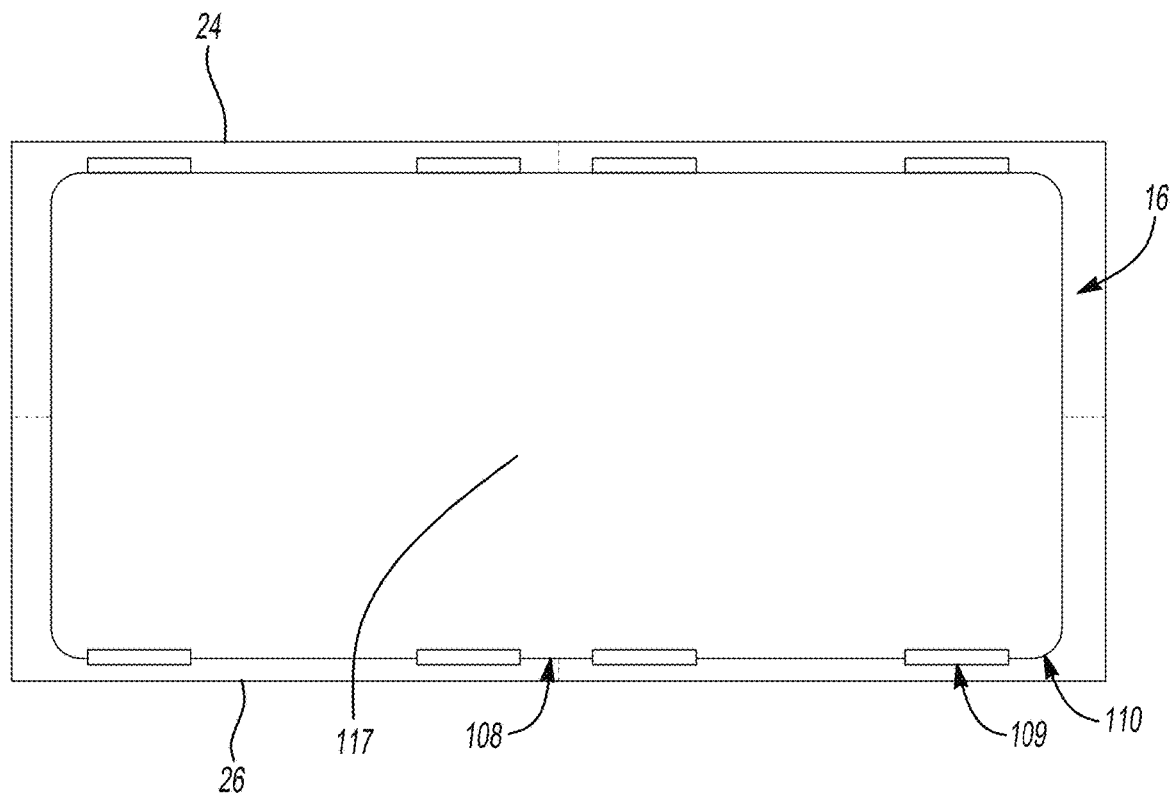
FIG. 10A is a schematic illustration of a top view of a display article formed from the workpiece of FIG. 9A.
Figure 10B:
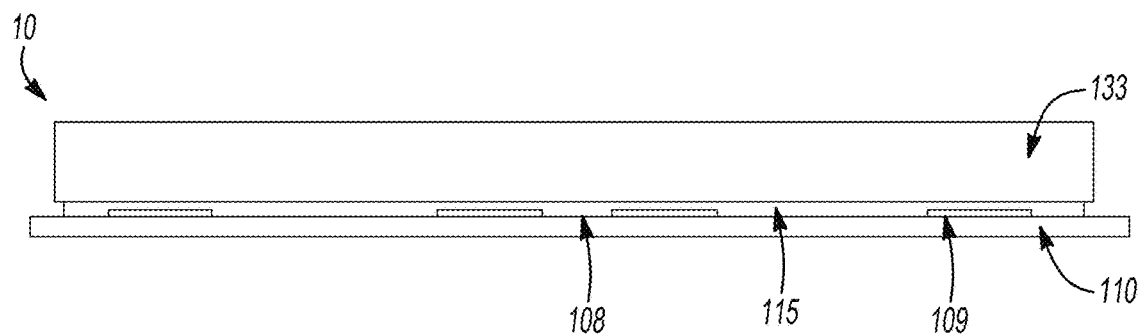
FIG. 10B is a schematic illustration of a side view of the display article of FIG. 10A.

Referring to the Figures, wherein like reference numerals refer to like elements, a display article 10 and a method 12 of forming the display article 10 are shown generally in FIGS. 10A and 11, respectively. The display article 10 is formed from a workpiece 14 that is shown generally in FIGS. 3B-9B. The display article 10, workpiece 14, and method 12 may be useful for applications requiring a first substrate 100 and a second substrate 200 optically bonded together with, for example, a liquid optically clear adhesive 16. In particular, the method 12 may be useful for forming display articles 10 that are free from optical defects, such as entrained air 152 (FIGS. 3B and 4B), e.g., air bubbles trapped between the first substrate 100 and the second substrate 200. That is, as set forth in more detail below, the method 12 includes depositing 18 (FIG. 11) the liquid optically clear adhesive 16 in a first fill pattern 20 and a second contact pattern 22 that, when disposed in contact with one another, optically bonds the first substrate 100 and the second substrate 200 together while eliminating all entrained air 152 between the first substrate 100 and second substrate 200 caused by, for example, slight warpage of the first substrate 100 and/or the second substrate 200 with respect to one another.

Therefore, the display article 10, workpiece 14, and method 12 may be useful for automotive applications such as, but not limited to, instrument clusters or infotainment devices. Alternatively, the display article 10, workpiece 14, and method 12 may be useful for non-automotive applications, such as, but not limited to, industrial vehicles, recreational off-road vehicles, aircraft, trains, and the like. In addition, the display article 10, workpiece 14, and method 12 may be useful for non-vehicular applications such as, but not limited to, televisions, computer displays, smartphones, watches, tablets, and the like.

Figure 3A:
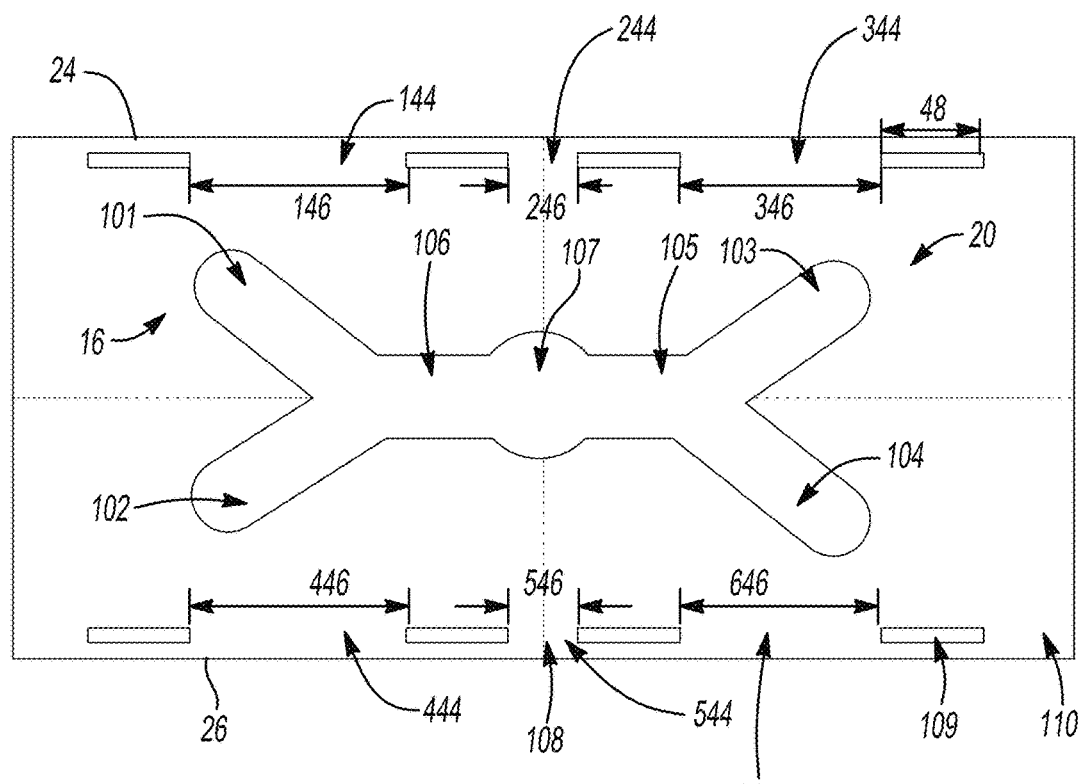
FIG. 3A is a schematic illustration of a top view of the first fill pattern of FIG. 1A after the first fill pattern has begun to flow toward the dam of FIG. 1A.
Figure 3B:
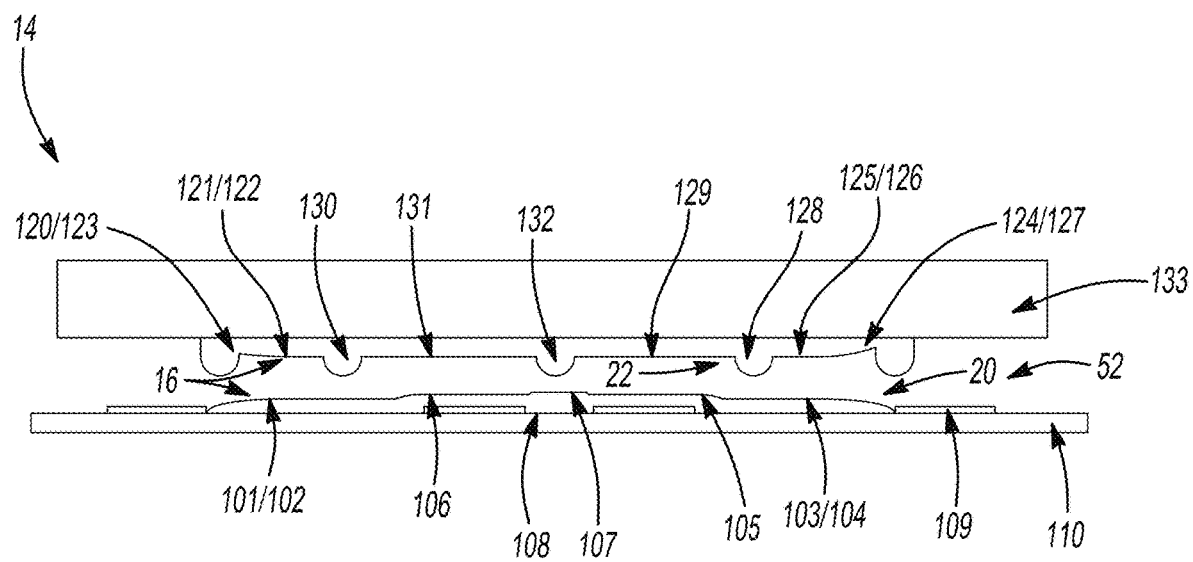
FIG. 3B is a schematic illustration of a side view of a workpiece including the first substrate and the second substrate spaced apart from the first substrate to define an air gap therebetween.

Referring now to FIG. 3B, the workpiece 14 for the display article 10 may be a precursor to the display article 10. That is, the workpiece 14 may be formed by intermediate or sub processes of the method 12, as set forth in more detail below.

Figure 1A:
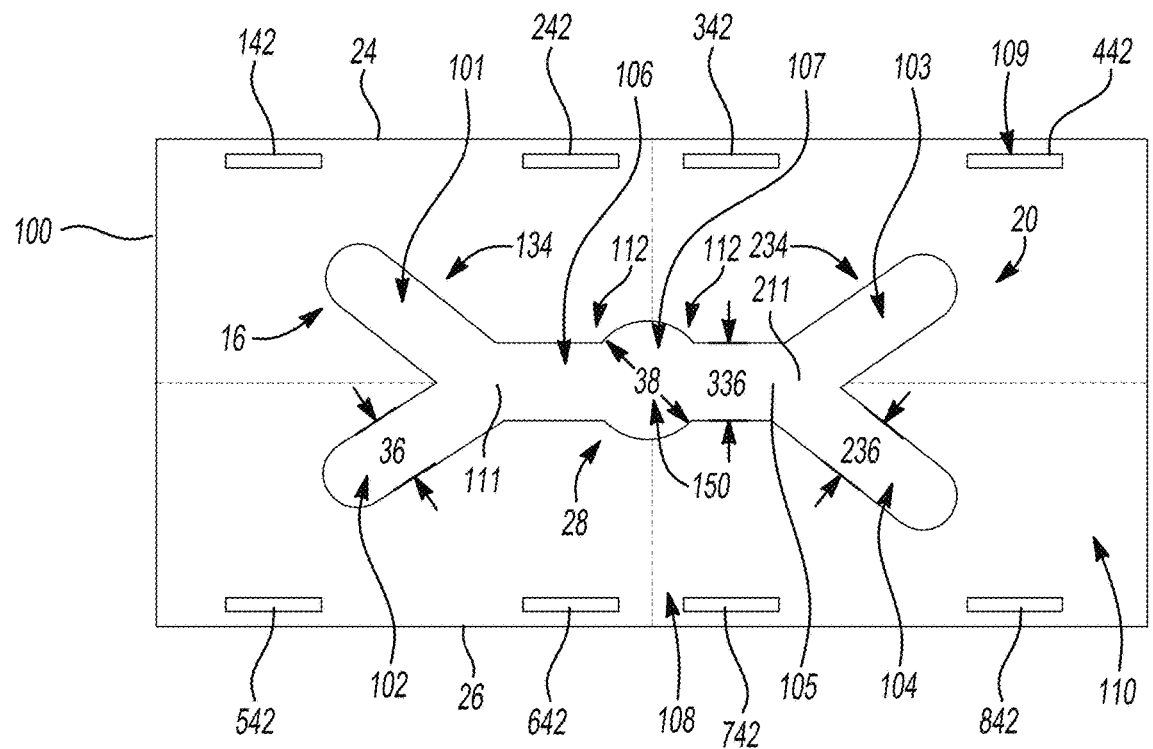
FIG. 1A is a schematic illustration of a top view of a liquid optically clear adhesive disposed on a first substrate in a first fill pattern and a dam disposed on the first substrate.

More specifically, as shown in FIG. 1A, the workpiece 14 includes the first substrate 100 having a top edge 24, a bottom edge 26 spaced apart from the top edge 24, and a center 28 disposed at a midpoint between the top edge 24 and the bottom edge 26. For example, the first substrate 100 may have a rectangular shape. In addition, the first substrate 100 may have a first thickness 30 and a fill surface 32 configured for receiving the liquid optically clear adhesive 16. The first substrate 100 may be formed from a suitable material such as, but not limited to, polycarbonate, glass, and the like. Although the first substrate 100 may be any portion or layer of the eventual display article 10, for ease of reference, the first substrate 100 may be a bottom substrate that may be configured as a cover lens. In one embodiment, the first substrate 100 may have a radius of curvature of from 0.1 mm to 600 mm. That is, the first substrate 100 may be curved. Alternatively, the first substrate 100 may not have a radius of curvature. That is, the first substrate 100 may be flat. Further, the first substrate 100 may be rigid.

Referring to FIG. 1A, the workpiece 14 also includes the liquid optically clear adhesive 16 disposed on the first substrate 100 in the first fill pattern 20 to form a coated first substrate 110. The first fill pattern 20 described in more detail below may be configured as a first dog bone or other similar shape and may be suitable for spreading along the first substrate 100 and filling an entirety of the first substrate 100 during bonding of the first and second substrates 100, 200.

Although also set forth in more detail below, the liquid optically clear adhesive 16 may be dispensed as a dual component silicone from a dispenser (not shown) in one of a first flow rate and a second flow rate that is less than the first flow rate. That is, for the first fill pattern 20, the liquid optically clear adhesive 16 may be dispensed at the first flow rate, which may dispense the liquid optically clear adhesive 16 in a comparatively greater quantity with comparatively less accuracy. However, for the second contact pattern 22, the liquid optically clear adhesive 16 may be dispensed at the slower second flow rate to dispense the liquid optically clear adhesive 16 in a comparatively lesser quantity with comparatively greater accuracy. Further, as set forth in more detail below, certain portions of the second contact pattern 22 may be dispensed at a comparatively faster first dispenser speed, while other portions of the second contact pattern 22 may be dispensed at a comparatively slower second dispenser speed to form one or more built up areas of liquid optically clear adhesive 16.

The liquid optically clear adhesive 16 may provide the display article 10 with excellent robustness and display performance, and may minimize a distance between the first substrate 100 and the second substrate 200. Further, the liquid optically clear adhesive 16 may provide the display article 10 with a reduced reflection between the first substrate 100 and the second substrate 200, and a refractive incidence almost coincident to all layers of the display article 10. That is, the liquid optically clear adhesive 16 may have a refractive index that is similar to the refractive indices of the first substrate 100 and the second substrate 200, e.g., about 1.5.

Referring again to FIG. 1A, the first fill pattern 20 includes a first chevron 134 having a first vertex 111, and a second chevron 234 spaced apart from the first chevron 134 and having a second vertex 211. Further, the first fill pattern 20 includes a linear middle segment 112 having a first midpoint 150 and interconnecting the first vertex 111 and the second vertex 211, and a central dot portion 107 disposed at the first midpoint 150. The first fill pattern 20 may occupy less than or equal to 40% of a surface area of the first substrate 100.

Figure 1B:
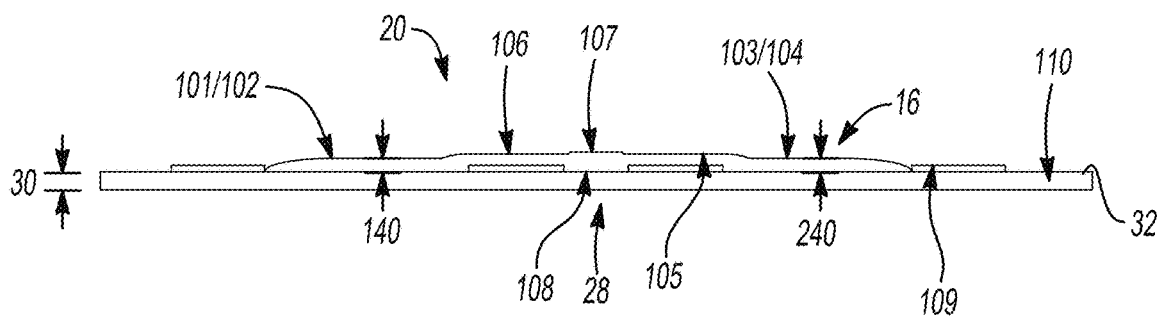
FIG. 1B is a schematic illustration of a side view of the first fill pattern of FIG. 1A.

More specifically, as described with reference to FIGS. 1A and 1B, the first chevron 134 may have a first width 36, and the second chevron 234 may have a second width 236 that is equal to the first width 36. Further, the linear middle segment 112 may have a third width 336 that is equal to the first width 36 and the second width 236. As such, the first chevron 134, the second chevron 234, and the linear middle segment 112 may each have an equal width 36, 236, 336 such that the first fill pattern 20 is generally shaped as a uniform dog bone or other similar shape. However, as best shown in FIG. 1A, the central dot portion 107 may have a diameter 38 that is greater than the third width 336. That is, the central dot portion 107 may be wider than the linear middle segment 112 and therefore protrude toward the top edge 24 and the bottom edge 26 from the linear middle segment 112 at the first midpoint 150.

In addition, as described with reference to FIG. 1B, the first chevron 134 may have a first height 140; the second chevron 234 may have a second height 240 that is equal to the first height 140; and the linear middle segment 112 may have a third height 340 that is greater than the first height 140. Further, the central dot portion 107 may have a fourth height 440 that is greater than the third height 340. As such, the first fill pattern 20 may be graduated in height and may be taller at the first midpoint 150 than at a top 101 or bottom 102 of the first chevron 134 and at a top 103 or bottom 104 of the second chevron 234. Therefore, when the first fill pattern 20 contacts the second contact pattern 22, as set forth in more detail below, the central dot portion 107 may contact the second contact pattern 22 first.

With continued reference to FIG. 1A, the workpiece 14 also includes a dam 109 disposed on the first substrate 100 and spaced apart from the first fill pattern 20. That is, the dam 109 may be configured for restraining a flow of the liquid optically clear adhesive 16 during bonding of the first substrate 100 and the second substrate 200. In addition, the dam 109 may maintain a determined distance between the first substrate 100 and the second substrate 200 and may ensure alignment of the first substrate 100 with respect to the second substrate 200. During initial formation of the workpiece 14, the dam 109 may be spaced apart from the first fill pattern 20 as shown in FIG. 1A. The dam 109 may be formed from a curable material such as a dual component silicone and may be pre-cured by exposing the dam material to ultraviolet radiation and fully cured upon compression of the liquid optically clear adhesive 16 disposed on the second substrate 200, as set forth in more detail below.

As best shown in FIG. 1A, the dam 109 includes a first dam portion 142 disposed along the top edge 24 of the first substrate 100, and a second dam portion 242 disposed along the top edge 24 and spaced apart from the first dam portion 142 to define a first gap 144 therebetween. Further, the dam 109 includes a third dam portion 342 disposed along the top edge 24 and spaced apart from the second dam portion 242 to define a second gap 244 therebetween. Likewise, the dam 109 includes a fourth dam portion 442 disposed along the top edge 24 and spaced apart from the third dam portion 342 to define a third gap 344 therebetween.

The dam 109 also includes a fifth dam portion 542 disposed along the bottom edge 26 and spaced opposite the first dam portion 142. That is, the fifth dam portion 542 and the first dam portion 142 may be vertically aligned. In addition, the dam 109 includes a sixth dam portion 642 disposed along the bottom edge 26, spaced opposite the second dam portion 242, and spaced apart from the fifth dam portion 542 to define a fourth gap 444 therebetween. That is, the sixth dam portion 642 may be vertically aligned with the second dam portion 242 and the first gap 144 may be spaced opposite the fourth gap 444. Further, the dam 109 includes a seventh dam portion 742 disposed along the bottom edge 26, spaced opposite the third dam portion 342, and spaced apart from the sixth dam portion 642 to define a fifth gap 544 therebetween. That is, the seventh dam portion 742 may be vertically aligned with the third dam portion 342 and the fifth gap 544 may be spaced apart from the second gap 244 along a vertical centerline 108 of the first substrate 100. Finally, the dam 109 includes an eighth dam portion 842 disposed along the bottom edge 26, spaced opposite the fourth dam portion 442, and spaced apart from the seventh dam portion 742 to define a sixth gap 644 therebetween. As such, the eighth dam portion 842 may be vertically aligned with the fourth dam portion 442, and the sixth gap 644 may be spaced apart from the third gap 344.

Referring to FIG. 3A, the first gap 144 may have a first gap width 146, and the third gap 344 may have a third gap width 346 that is equal to the first gap width 146. Further, the second gap 244 may have a second gap width 246 that is less than the first gap width 146. Similarly, the fourth gap 444 may have a fourth gap width 446, and the sixth gap 644 may have a sixth gap width 646 that is equal to the fourth gap width 446. Further, the fifth gap 544 may have a fifth gap width 546 that is less than the fourth gap width 446. The first gap width 146 may be equal to the fourth gap width 446, and the second gap width 246 may be equal to the fifth gap width 546. In addition, the first dam portion 142, the second dam portion 242, the third dam portion 342, the fourth dam portion 442, the fifth dam portion 542, the sixth dam portion 642, the seventh dam portion 742, and the eighth dam portion 842 may have an equal length 48. The aforementioned dam configuration may contain a flow of the liquid optically clear adhesive 16 during compression and contact with the second contact pattern 22, as set forth below.

Figure 2A:
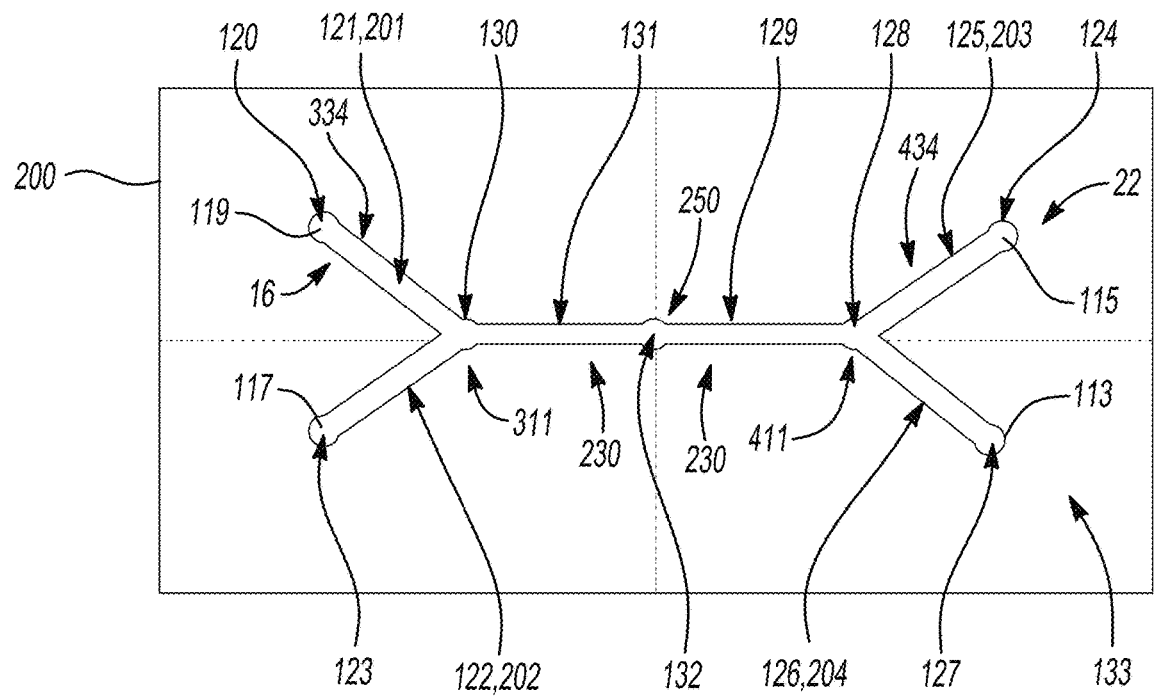
FIG. 2A is a schematic illustration of a top view of the liquid optically clear adhesive of FIG. 1A disposed on a second substrate in a second contact pattern.
Figure 2B:
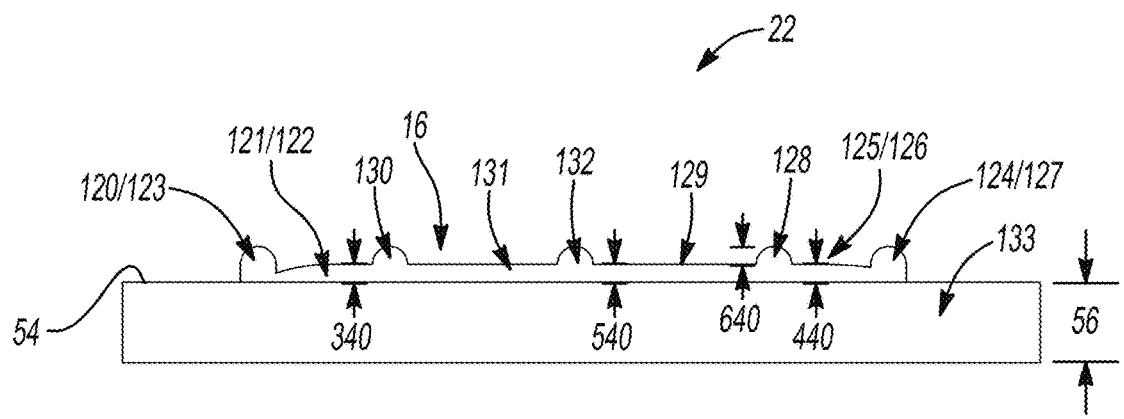
FIG. 2B is a schematic illustration of a side view of the second contact pattern of FIG. 2A.

Referring now to FIGS. 2A and 2B, the workpiece 14 also includes a coated second substrate 133 spaced apart from and facing the coated first substrate 110 to define the air gap 52 (FIG. 3B) therebetween. The coated second substrate 133 includes the second substrate 200 that may have a contact surface 54 configured for receiving the liquid optically clear adhesive 16. Further, the second substrate 200 may have a second thickness 56 that is greater than or equal to the first thickness 30. Alternatively, the second thickness 56 may be less than the first thickness 30. The second substrate 200 may be formed form a suitable material such as, but not limited to, polycarbonate, glass, and the like. The second substrate 200 may be formed from the same material or a different material than the first substrate 100. Although the second substrate 200 may be any portion or layer of the eventual display article 10, for ease of reference, the second substrate 200 may be a top substrate that may be configured as a display.

In one embodiment, the second substrate 200 may have a radius of curvature of from 0.1 mm to 600 mm. That is, the second substrate 200 may be curved. Alternatively, the second substrate 200 may not have a radius of curvature. That is, the second substrate 200 may be flat. Therefore, one or more of the first substrate 100 and the second substrate 200 may have a radius of curvature, or one or more of the first substrate 100 and the second substrate 200 may not have a radius of curvature. For example, the first substrate 100 may be curved and the second substrate 200 may be flat, or the first substrate 100 may be flat and the second substrate 200 may be curved. Further, the second substrate 200 may be rigid.

As shown in FIG. 3B, during production of the workpiece 14, the second substrate 200 may be spaced apart from, and may be parallel to, the first substrate 100 to define the air gap 52 therebetween. During formation of the display article 10, the first substrate 100 and the second substrate 200 may translate towards one another to eliminate the air gap 52, as set forth in more detail below.

Referring now to FIGS. 2A and 2B, the workpiece 14 also includes the liquid optically clear adhesive 16 disposed on the second substrate 200 in the second contact pattern 22. The second contact pattern 22 may be configured for contacting the first fill pattern 20 as the first substrate 100 and the second substrate 200 translate towards each other to optically bond the first substrate 100 and the second substrate 200 together. In particular, as the liquid optically clear adhesive 16 disposed in the first fill pattern 20 merges with the liquid optically clear adhesive 16 disposed in the second contact pattern 22, the liquid optically clear adhesive 16 may spread evenly and compensate for any differences in thickness between the first substrate 100 and the second substrate 200. For example, the first fill pattern 20 and the second contact pattern 22 may ensure that a thickness of the liquid optically clear adhesive 16 at an edge of the workpiece 14 is not thicker than the thickness of the liquid optically clear adhesive 16 at a middle of the workpiece 14.

Therefore, the second contact pattern 22 may have a specific configuration. That is, the second contact pattern 22, although described in more detail below, may be configured as a second dog bone or other similar shape and may be suitable for spreading along the second substrate 200 and contacting the liquid optically clear adhesive 16 disposed on the first substrate 100 during bonding of the first substrate 100 and the second substrate 200. Stated differently, the second contact pattern 22 may mirror the first fill pattern 20, but may be formed from a smaller quantity of liquid optically clear adhesive 16 than the quantity of liquid optically clear adhesive 16 used to form the first fill pattern 20.

In particular, as best shown in FIG. 2A, the second contact pattern 22 includes a third chevron 334 that includes a first linear segment 121 having a first end 119, and a second linear segment 122 having a second end 117 and connected to the first linear segment 121 at a third vertex 311. Similarly, the second contact pattern 22 includes a fourth chevron 434 that includes a third linear segment 125 having a third end 115, and a fourth linear segment 126 having a fourth end 113 and connected to the third linear segment 125 at a fourth vertex 411. In addition, the second contact pattern 22 includes a centerline portion having a second midpoint 250 and interconnecting the third vertex 311 and the fourth vertex 411. As such, the second contact pattern 22 may be shaped as a second dog bone or other similar shape that is narrower than the first fill pattern 20 set forth above.

Therefore, as best shown in FIG. 3B, when the first fill pattern 20 is spaced apart from and opposite the second contact pattern 22 to define the air gap 52 therebetween, the first chevron 134 may be aligned with the third chevron 334. Similarly, the linear middle segment 112 may be aligned with the centerline portion 230. Likewise, the second chevron 234 may be aligned with the fourth chevron 434.

Referring now to FIG. 2B, the third chevron 334 may have a third height 340 at the third vertex 311, and the fourth chevron 434 may have a fourth height 440 at the fourth vertex 411 that is equal to the third height 340. Further, the centerline portion 230 may have a fifth height 540 that is equal to the third height 340 and the fourth height 440.

As described with continued reference to FIG. 2B, the second contact pattern 22 has a first dot portion 120 disposed at the first end 119, a second dot portion 123 disposed at the second end 117, a third dot portion 124 disposed at the third end 115, and a fourth dot portion 127 disposed at the fourth end 113. The second contact pattern 22 also has a fifth dot portion 130 disposed at the third vertex 311, a sixth dot portion 128 disposed at the fourth vertex 411, and a middle dot portion 132 disposed at the second midpoint 250.

However, each of the first dot portion 120, the second dot portion 123, the third dot portion 124, the fourth dot portion 127, the fifth dot portion 130, the sixth dot portion 128, and the middle dot portion 132 may have a dot height 640 that is greater than the fifth height 540. That is, each of the dot portions 120, 123, 124, 127, 130, 128, 132 may protrude above a plane of the third chevron 334, fourth chevron 434, and centerline portion 230. As such, each dot portion 120, 123, 124, 127, 130, 128, 132 may contact the first fill pattern 20 first before the remainder of the second contact pattern 22 contacts the first fill pattern 20 as the first substrate 110 and second substrate 200 translate towards one another.

As such, the second contact pattern 22 may be graduated in height and may be taller at the second midpoint 250, third vertex 311, fourth vertex 411, a top 201 and bottom 202 of the third chevron 334, and at a top 203 and bottom 204 of the fourth chevron 434 than at the centerline portion 230. Therefore, when the first fill pattern 20 contacts the second contact pattern 22, as set forth in more detail below, each of the dot portions 120, 123, 124, 127, 130, 128, 132 may contact the first fill pattern 20 first.

It is to be appreciated that the workpiece 14 may include a plurality of coated first substrates 110 and a plurality of coated second substrates 133. For example, two or more coated first substrates 110 may be disposed in alternating arrangement with and bonded to two or more coated second substrates 133 to form the display article 10. That is, the display article 10 may include multiple first substrates 100 and multiple second substrates 200 each bonded to one another with the liquid optically clear adhesive 16. Similarly, the display article 10 may include a plurality of workpieces 14.

Referring now to FIG. 11, the method 12 of forming the display article 10 includes dispensing 58 the dam material on the first substrate 100. For example, the dam material may be a silicone and dispensing 58 may include ejecting the dam material from the dispenser (not shown) onto the first substrate 100 to form the dam 109 having the aforementioned configuration of eight segments arranged symmetrically. In addition, prior to dispensing 58, the method 12 may include treating 60 the first substrate 100 and the second substrate 200 with plasma. That is, the method 12 may include arranging the first substrate 100 and the second substrate 200 with the fill surface 32 and the contact surface 54 facing up, treating 60 the first substrate 100 and the second substrate 200 with plasma, and then dispensing the dam material onto the first substrate 100.

The method 12 also includes, after dispensing 58, pre-curing 62 the dam material to form the dam 109. For example, the dam material may be pre-cured by exposing the dam material to ultraviolet radiation having a wavelength of from 280 nm to 320 nm. Therefore, the dam material may be initially dispensed as a soft material, but may gradually cure as the display article 10 is formed. That is, pre-curing 62 may pre-activate the dam material to ensure that the dam material may be fully cured upon completion of the optical bonding of the first substrate 100 and the second substrate 200. The dam material may provide initial attachment between the first substrate 100 and the second substrate 200, and, upon completion of optical bonding, the dam material may be fully cured to ensure a uniform bond thickness, e.g., from 0.1 mm to 0.6 mm, between the first substrate 100 and the second substrate 200.

In particular, as best shown in FIG. 1A, pre-curing 62 the dam material may include forming the dam 109 that includes the first dam portion 142 spaced along the top edge 24, and the second dam portion 242 disposed along the top edge 24 and spaced apart from the first dam portion 142 to define the first gap 144 therebetween. The dam 109 may also include the third dam portion 342 disposed along the top edge 24 and spaced apart from the second dam portion 242 to define the second gap therebetween. In addition, the dam 109 may include the fourth dam portion 442 disposed along the top edge 24 and spaced apart from the third dam portion 342 to define the third gap 344 therebetween. Similarly, the dam 109 may include the fifth dam portion 542 disposed along the bottom edge 26 and spaced opposite the first dam portion 142, and the sixth dam portion 642 disposed along the bottom edge 26, spaced opposite the second dam portion 242, and spaced apart from the fifth dam portion 542 to define the fourth gap 444 therebetween. Likewise, the dam 109 may include the seventh dam portion 742 disposed along the bottom edge 26, spaced opposite the third dam portion 342, and spaced apart from the sixth dam portion 642 to define the fifth gap 544 therebetween. The dam 109 may also include the eighth dam portion 842 disposed along the bottom edge 26, spaced opposite the fourth dam portion 442, and spaced apart from the seventh dam portion 742 to define the sixth gap 644 therebetween.

The method 12 further includes depositing 18 the liquid optically clear adhesive 16 in the first fill pattern 20 onto the first substrate 100 such that the first fill pattern 20 is spaced apart from the dam 109 to thereby form a coated first substrate 110. That is, depositing 18 the liquid optically clear adhesive 16 may include ejecting the liquid optically clear adhesive 16 onto the first substrate 100, e.g., the fill surface 32 of the first substrate 100, from the dispenser (not shown) at the first flow rate. The first flow rate may be a comparatively fast flow rate, since the first fill pattern 20 may be less precise than the second contact pattern 22. For example, the first flow rate may be from 32 mL/min to 80 mL/min and the second flow rate may be from 5 mL/min to 15 mL/min. That is, the first flow rate may allow time for the first fill pattern 20 to spread. Conversely, the second flow rate may allow more precise dispensing of the second contact pattern 22 with comparatively greater accuracy. Further, as set forth above, depositing 18 the liquid optically clear adhesive 16 onto the first substrate 100 may include forming the first fill pattern 20 that includes the first chevron 134, the second chevron 234 spaced apart from the first chevron 134, the linear middle segment 112 interconnecting the first chevron 134 and the second chevron 234, and the central dot portion 107 disposed at the first midpoint 150.

Referring again to FIG. 1A, depositing 18 the liquid optically clear adhesive 16 in the first fill pattern 20 may occur in a specific order of operation. For example, depositing 18 the first fill pattern 20 may include dispensing the first chevron 134 from the top 101 of the first chevron 134 to the bottom 102 of the first chevron 134. After dispensing the first chevron 134, the method 12 may include dispensing the second chevron 234 from the top 103 of the second chevron 234 to the bottom 104 of the second chevron 234. Further, the method 12 may include, after dispensing the second chevron 234, dispensing a first portion 105 of the linear middle segment 112 from the first vertex 111 to the first midpoint 150. After dispensing the first portion 105, the method 12 may include dispensing a second portion 106 of the linear middle segment 112 from the second vertex 211 to the first midpoint 150. Finally, after dispensing the second portion 106, the method 12 may include dispensing the central dot portion 107 at the first midpoint 150.

Referring now to FIGS. 2A and 2B, the method 12 also includes depositing 18 the liquid optically clear adhesive 16 in the second contact pattern 22 onto the second substrate 200 to thereby form a coated second substrate 133. That is, depositing 18 the liquid optically clear adhesive 16 may include ejecting the liquid optically clear adhesive 16 onto the second substrate 200, e.g., the contact surface 54 of the second substrate 200, from the dispenser (not shown) at a second flow rate that is less than the first flow rate. That is, the second flow rate may be a comparatively slow flow rate, since the second contact pattern 22 may be more precise than the first fill pattern 20. Further, as set forth above, depositing 18 the liquid optically clear adhesive 16 onto the second substrate 200 may include forming the second contact pattern 22 that includes the third chevron 334, the fourth chevron 434 spaced apart from the third chevron 334, the centerline portion 230 interconnecting the third chevron 334 and the fourth chevron 434, the first through sixth dot portions 120, 123, 124, 127, 130, 128, and the middle dot portion 132 disposed at the second midpoint 250.

Referring again to FIG. 2A, depositing 18 the liquid optically clear adhesive 16 in the second contact pattern 22 may occur in a specific order of operation. For example, depositing 18 the second contact pattern 22 may include dispensing the third chevron 334 from the top 201 of the third chevron 334 to the bottom 202 of the third chevron 334. After dispensing the third chevron 334, the method 12 may include dispensing the fourth chevron 434 from the top 203 of the fourth chevron 434 to the bottom 204 of the fourth chevron 434. Further, the method 12 may include, after dispensing the fourth chevron 434, dispensing a first part 129 of the centerline portion 230 from the third vertex 311 to the second midpoint 250. After dispensing the first part 129, the method 12 may include dispensing a second part 131 of the centerline portion 230 from the fourth vertex 411 to the second midpoint 250. Finally, after dispensing the second part 131, the method 12 may include dispensing the middle dot portion 132 at the second midpoint 250.

More specifically, depositing 18 the second contact pattern 22 may further include dispensing the third chevron 334 from the top 201 of the third chevron 334 to the bottom 202 of the third chevron 334 from the dispenser at the first dispenser speed. That is, although the third chevron 334 and entire second contact pattern 22 may be deposited at the constant second flow rate, the third chevron 334 may be dispensed at the first dispenser speed so that the top 201 and bottom 202 may be formed relatively quickly. However, prior to dispensing the third chevron 334, the method 12 may include dispensing the first dot portion 120 from the dispenser at a second dispenser speed that is lower than the first dispenser speed. That is, the first dot portion 120 may be dispensed more slowly than the third chevron 334 such that the dispenser lingers comparatively longer over the area of the first dot portion 120. As such, the first dot portion 120 may be comparatively taller and protrude from the third chevron 334.

After dispensing the first dot portion 120, the method 12 may include dispensing the first linear segment 121 of the third chevron 334 from the dispenser at the first dispenser speed. Then, after dispensing the first linear segment 121, the method 12 may include dispensing the second dot portion 123 at the third vertex 311 from the dispenser at the second dispenser speed. Further, after dispensing the second dot portion 123, the method 12 may include dispensing the second linear segment 122 of the third chevron 334 from the dispenser at the first dispenser speed. After dispensing second linear segment 122, the method 12 may include dispensing the third dot portion 124 from the dispenser at the second dispenser speed.

After dispensing the third dot portion 124, the method 12 may include dispensing the fourth dot portion 127 from the dispenser at the second dispenser speed. After dispensing the fourth dot portion 127, the method 12 may include dispensing the third linear segment 125 of the fourth chevron 434 from the dispenser at the first dispenser speed. Then, after dispensing the third linear segment 125, the method 12 may include dispensing the fifth dot portion 130 at the fourth vertex 411 from the dispenser at the second dispenser speed.

After dispensing the fifth dot portion 130, the method 12 may include dispensing the fourth linear segment 126 of the fourth chevron 434 from the dispenser at the first dispenser speed. Next, after dispensing the fourth linear segment 126, the method 12 may include dispensing the sixth dot portion 128 from the dispenser at the second dispenser speed. After dispensing the sixth dot portion 128, the method 12 may include dispensing the first part 129 of the centerline portion 230 from the third vertex 311 to the second midpoint 250 from the dispenser at the first dispenser speed. Then, after dispensing the first part 129, the method 12 may include dispensing the second part 131 of the centerline portion 230 from the fourth vertex 411 to the second midpoint 250 from the dispenser at the first dispenser speed. After dispensing the second part 131, the method 12 may include dispensing the middle dot portion 132 at the second midpoint 250 from the dispenser at the second dispenser speed.

Therefore, since the second dispenser speed may be lower than the first dispenser speed, the first dot portion 120, the second dot portion 123, the third dot portion 124, the fourth dot portion 127, the fifth dot portion 130, the sixth dot portion 128, and the middle dot portion 132 may have a larger height than a remainder of the second contact pattern 22. As such, these dot portions 120, 123, 124, 127, 130, 128, 132 may be the first to contact the first fill pattern 20 as the first substrate 100 and the second substrate 200 translate towards each other.

As such, once the liquid optically clear adhesive 16 is disposed on the first substrate 100 in the first fill pattern 20 and on the second substrate 200 in the second contact pattern 22, the method 12 may include arranging the coated first substrate 110 and the coated second substrate 133 to face each other, while being spaced apart from one another to define the air gap 52, to thereby form the workpiece 14.

Next, the method 12 may include flipping 64 the coated second substrate 133 upside down. That is, flipping 64 may include turning the coated second substrate 133 so that the liquid optically clear adhesive 16 disposed in the second contact pattern 22 on the contact surface 54 is facing the first substrate 100. Therefore, during such flipping 64, each of the dot portions 120, 123, 124, 127, 130, 128 may droop or sag slightly to a teardrop formation which may allow for a plurality of single points 120, 123, 124, 127, 130, 128, 132 of contact with the first fill pattern 20. Such single points 120, 123, 124, 127, 130, 128, 132 of contact may ensure that air bubbles are eliminated as the liquid optically clear adhesive 16 spreads along the fill surface 32 and the contact surface 54.

Referring again to FIG. 11, the method 12 also includes translating 66 the coated first substrate 110 and the coated second substrate 133 towards one another to eliminate the air gap 52 defined between the coated first substrate 110 and the coated second substrate 133. Translating 66 may include moving the coated first substrate 110 towards the coated second substrate 133 or moving the coated second substrate 133 towards the coated first substrate 110.

For example, translating 66 may draw the coated first substrate 110 and the coated second substrate 133 together at a variable speed such that the coated first substrate 110 and the coated second substrate 133 remain parallel to one another. That is, although the coated first substrate 110 and the coated second substrate 133 may advance towards each other at the variable speed, translating 66 also include maintaining a lateral and/or longitudinal position of the coated first substrate 110 and the coated second substrate 133 so that the coated first substrate 110 and the coated second substrate 133 are parallel. For example, one or more robot arms may translate the coated first substrate 110 and the coated second substrate 133 towards one another at various speeds corresponding to various stages of the method 12 of from 0.1 mm/s to 0.3 mm/s, from 0.08 mm/s to 0.3 mm/s, and from 0.05 mm/s to 0.1 mm/s. Alternatively, one of the coated first substrate 110 and the coated second substrate 133 may be fixed while the other of the coated first substrate 110 and the coated second substrate 133 moves. Regardless, as the coated first substrate 110 and the coated second substrate 133 translate towards one another, the air gap 52 may be first minimized and then eliminated.

Figure 4A:
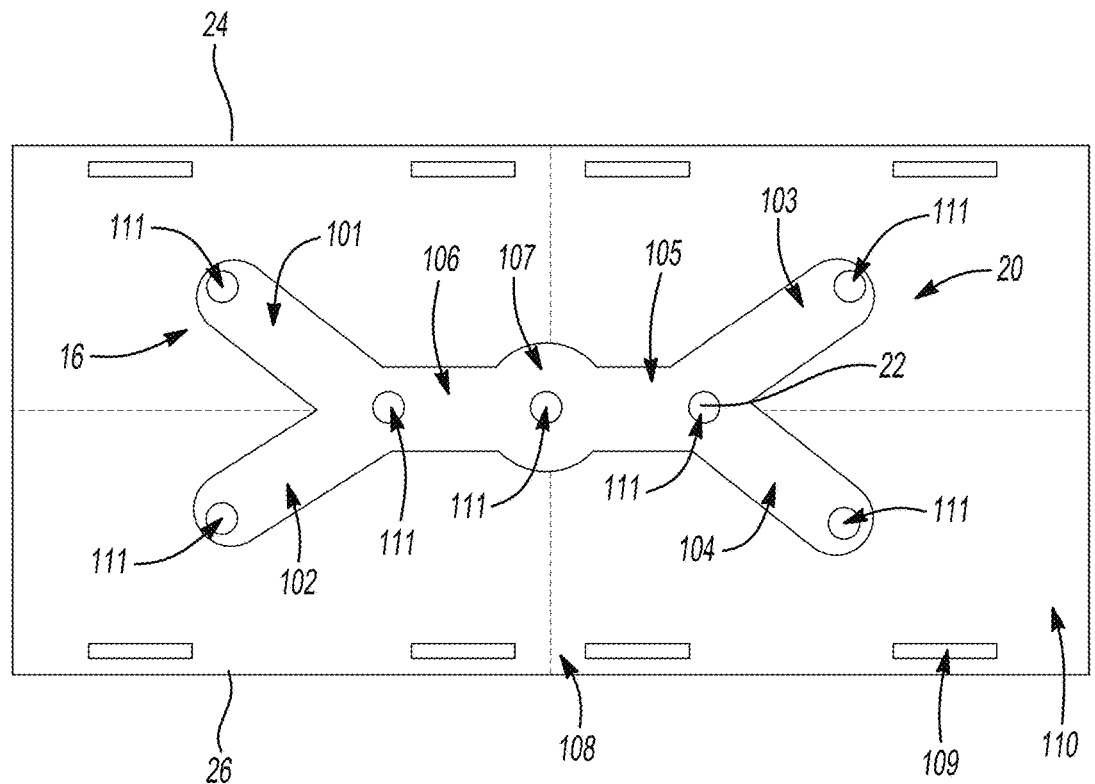
FIG. 4A is a schematic illustration of a top view of the workpiece of FIG. 3A in which the first fill pattern and the second contact pattern initially contact.
Figure 4B:
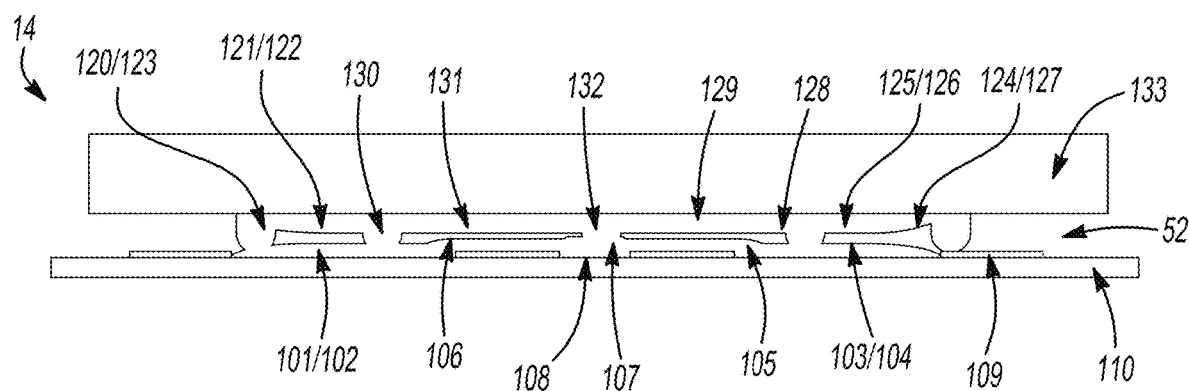
FIG. 4B is a schematic illustration of a side view of the workpiece of FIG. 4A.
Figure 5A:
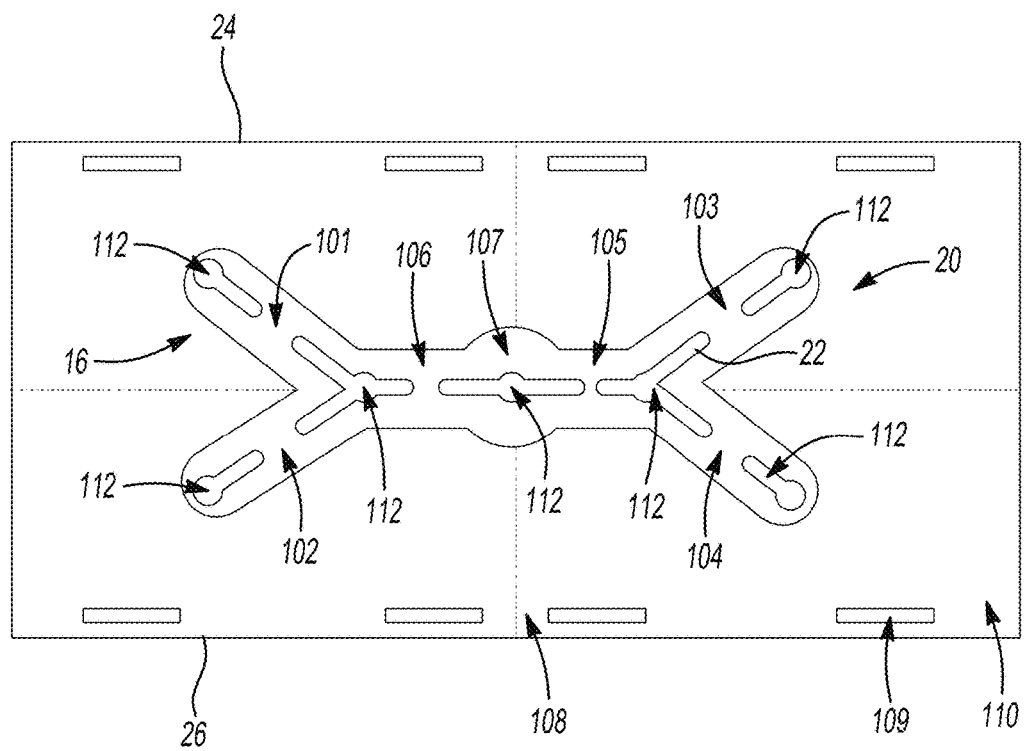
FIG. 5A is a schematic illustration of a top view of the workpiece of FIG. 3A during bonding of the first fill pattern and the second contact pattern.
Figure 5B:
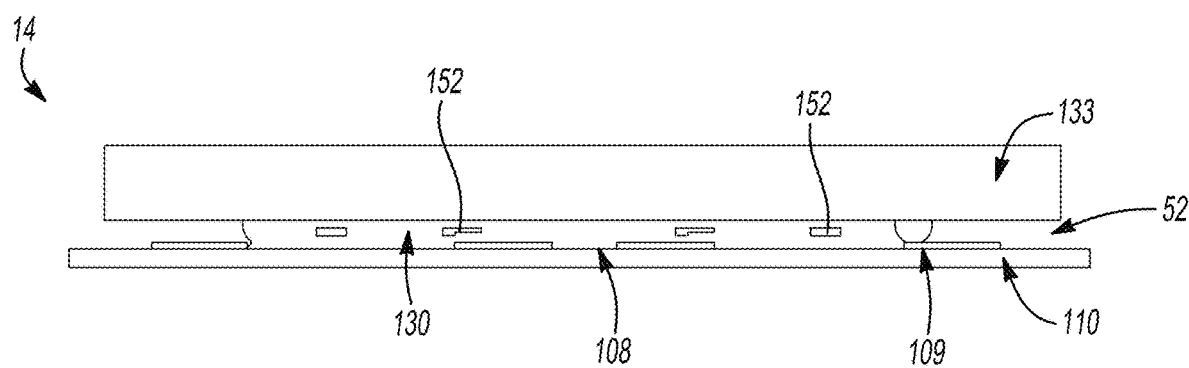
FIG. 5B is a schematic illustration of a side view of the workpiece of FIG. 5A.
Figure 6A:
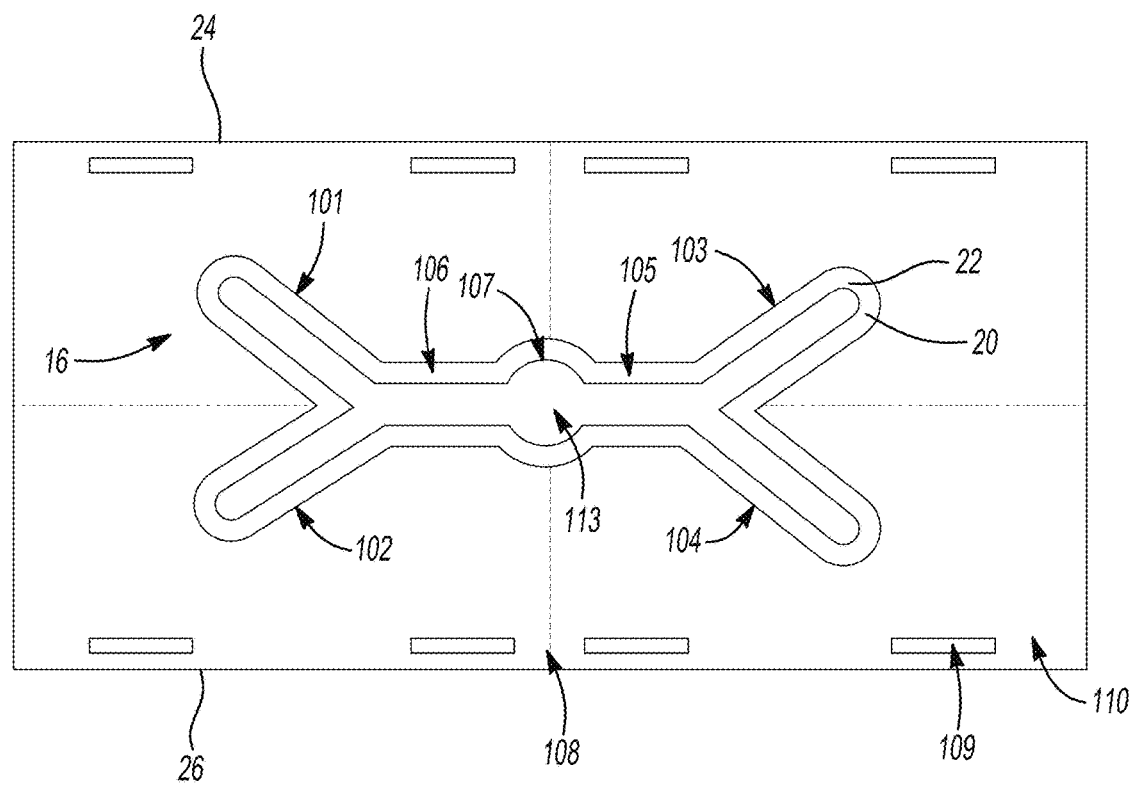
FIG. 6A is a schematic illustration of a top view of the workpiece of FIG. 3A in which the first fill pattern completely contacts the second contact pattern.
Figure 6B:
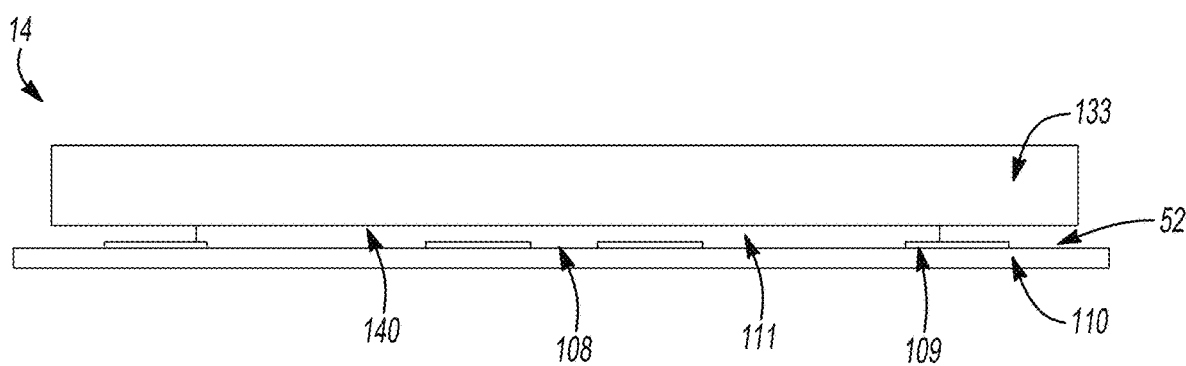
FIG. 6B is a schematic illustration of a side view of the workpiece of FIG. 6A.
Figure 7A:
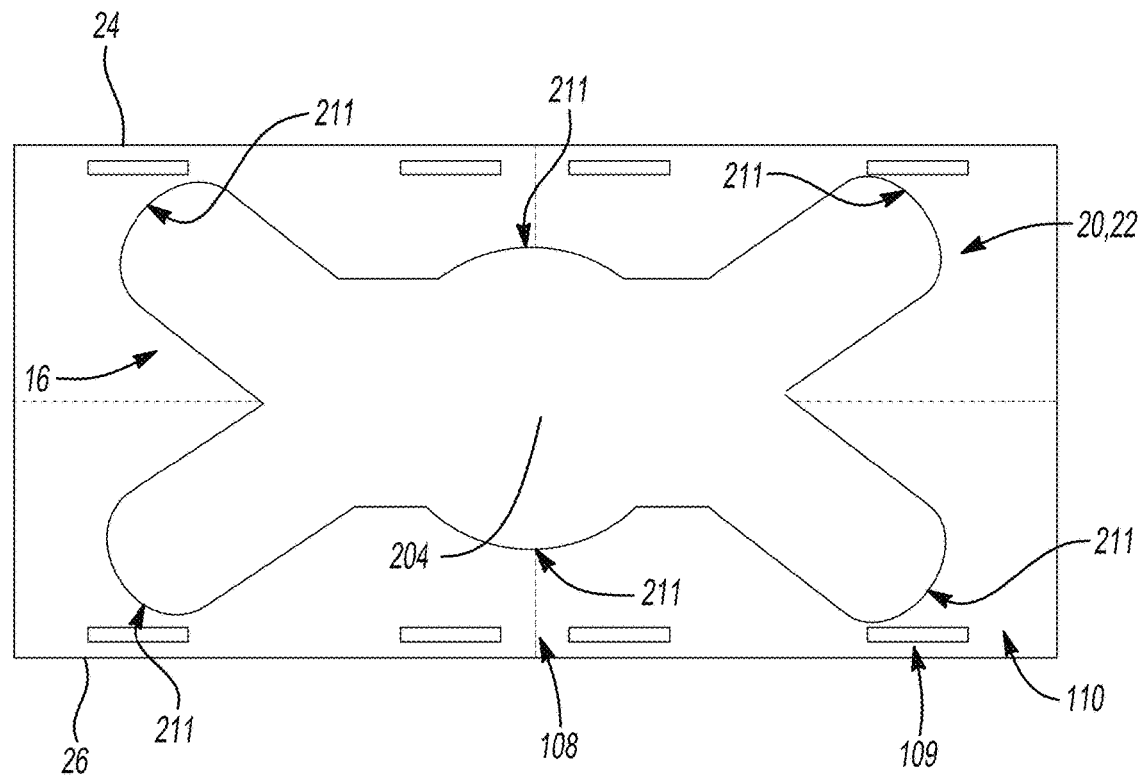
FIG. 7A is a schematic illustration of a top view of the workpiece of FIG. 3A in which the first fill pattern continues to contact the second contact pattern.
Figure 7B:
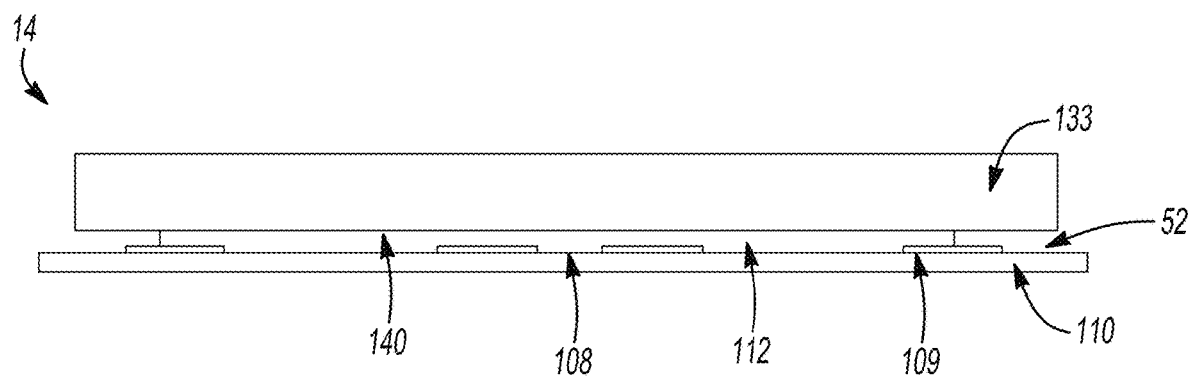
FIG. 7B is a schematic illustration of a side view of the workpiece of FIG. 7A.

Referring now to FIG. 4B, the method 12 also includes contacting 68 the first fill pattern 20 and the second contact pattern 22 at the plurality of single points 120, 123, 124, 127, 130, 128, 132 spaced apart from one another. That is, as the coated first substrate 110 and the coated second substrate 133 translate towards one another, the first fill pattern 20 and the second contact pattern 22 may touch at the central dot portion 107/middle dot portion 132 interface, at the fifth dot portion 130, and at the sixth dot portion 128. Such initial contact at only the plurality of single points 120, 123, 124, 127, 130, 128, 132 may ensure that extra liquid optically clear adhesive 16 at those single points 120, 123, 124, 127, 130, 128, 132 spreads outward from the second contact pattern 22 along the contact surface 54. Then, as the coated first substrate 110 and the coated second substrate 133 continue to translate towards one another, as best shown in FIGS. 5A and 5B, more of the first fill pattern 20 and the second contact pattern 22 may contact one another.

Referring now to FIGS. 6A-10B, the method 12 also includes compressing 70 the first fill pattern 20 and the second contact pattern 22 to eliminate the sixth gap width 646 and air 152 (FIGS. 4B and 5B) entrained between the coated first substrate 110 and the coated second substrate 133 and thereby form the display article 10. That is, compressing 70 may eliminate air bubbles disposed between the coated first substrate 110 and the coated second substrate 133.

In particular, compressing 70 may include controlling a spread of the first fill pattern 20 and the second contact pattern 22 along the first substrate 100 and the second substrate 200. That is, the specific configuration of the first fill pattern 20 and the second contact pattern 22 may precisely control the spread of the liquid optically clear adhesive 16 as the coated first substrate 110 and the coated second substrate 133 compress together. As such, the spread of the liquid optically clear adhesive 16 may be even, consistent, and measured, and overflow and/or underflow may be prevented. Further, vacuum during assembly of the display article 10 and autoclave after curing of the liquid optically clear adhesive 16 may not be necessary.

Figure 8A:
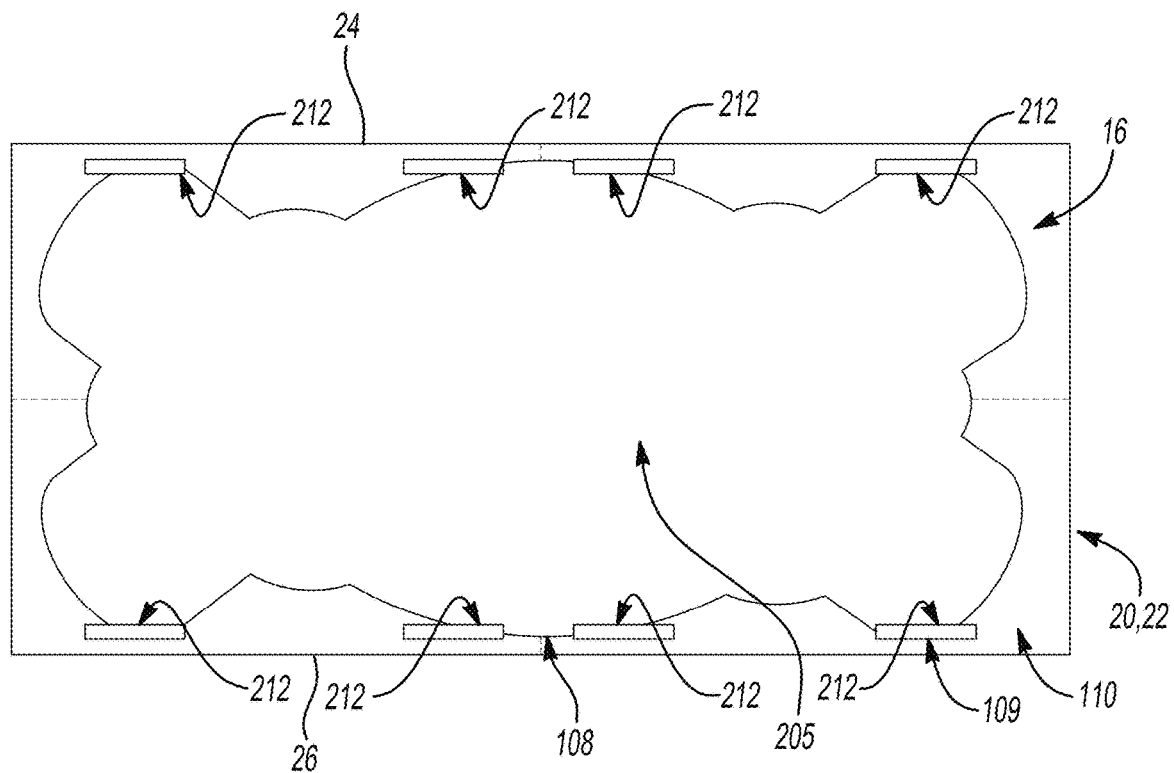
FIG. 8A is a schematic illustration of a top view of the workpiece of FIG. 3A in which the liquid optically clear adhesive spreads to contact the dam of FIG. 1A.
Figure 8B:
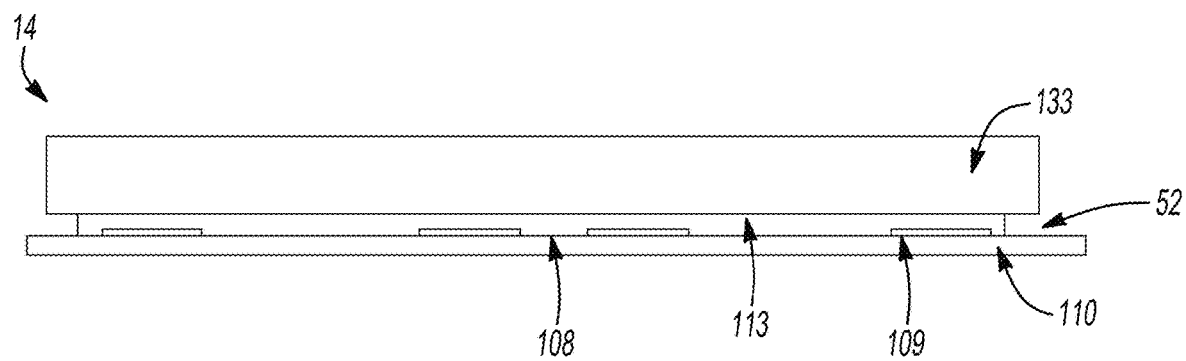
FIG. 8B is a schematic illustration of a side view of the workpiece of FIG. 8A.
Figure 9A:
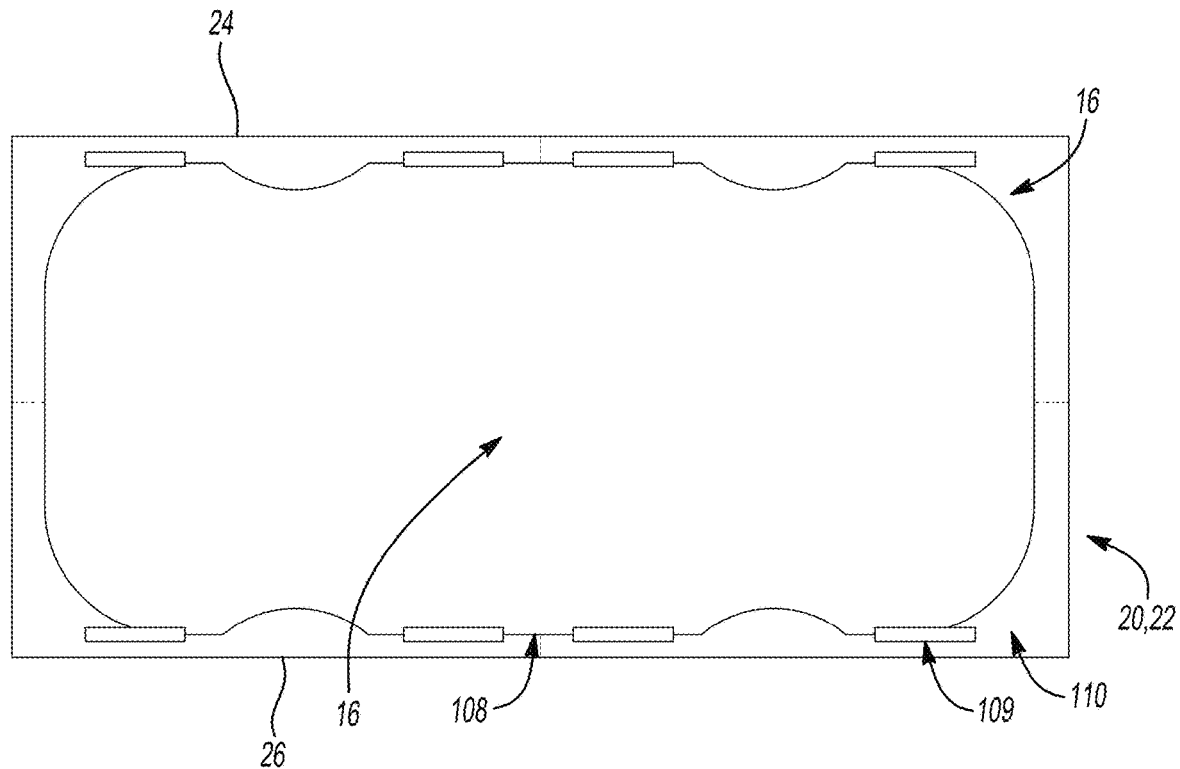
FIG. 9A is a schematic illustration of a top view of the workpiece of FIG. 3A in which the liquid optically clear adhesive is constrained by the dam of FIG. 1A.
Figure 9B:
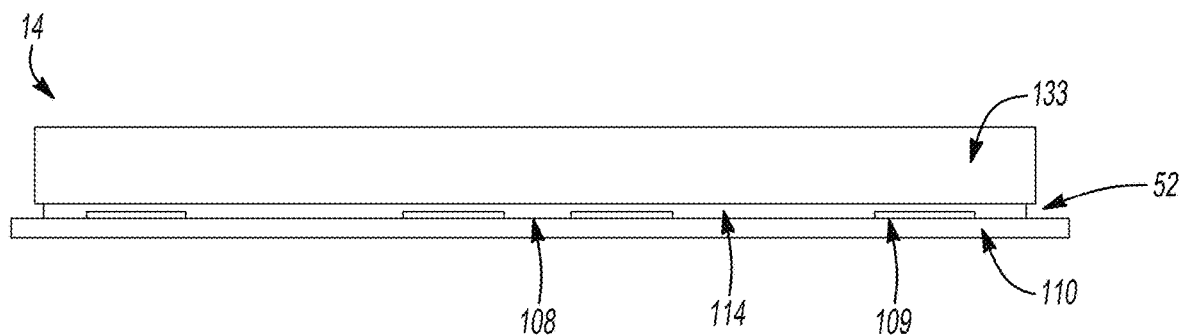
FIG. 9B is a schematic illustration of a side view of the workpiece of FIG. 9A.

Further, compressing 70 may include completely spreading the liquid optically clear adhesive 16 along the first substrate 100 and the second substrate 200 such that the first fill pattern 20 and the second contact pattern 22 merge, e.g., as shown at 205 in FIG. 8A, and contact the dam 109, as shown in FIGS. 8A-10B at 212. That is, the method 12 may further include spreading 72 the liquid optically clear adhesive 16 from the center 28 to the top edge 24 and from the center 28 to the bottom edge 26 so that the liquid optically clear adhesive 16 forms a flow front 114 (FIG. 9B) and contacts the dam 109, as shown by comparing FIGS. 8A, 9A, and 10A. Therefore, compressing 70 may also include curing the dam 109. That is, the dam material may fully cure to form the dam 109 as the liquid optically clear adhesive 16 of the first fill pattern 20 and the liquid optically clear adhesive 16 of the second contact pattern 22 contacts and compresses.

Therefore, the method 12 may include bonding 74 the first substrate 100 and the second substrate 200 together with the liquid optically clear adhesive 16. More specifically, bonding 74 may include optically and/or structurally adhering the first substrate 100 and the second substrate 200 together to form the display article 10.

Therefore, the method 12 and workpiece 14 may be useful for forming display articles 10 that are free from optical defects, such as entrained air 152, e.g., air bubbles, trapped between the first substrate 100 and the second substrate 200. That is, the method 12 includes depositing 18 the liquid optically clear adhesive 16 in the first fill pattern 20 and the second contact pattern 22 that, when disposed in contact with one another, optically bonds the first substrate 100 and the second substrate 200 together while eliminating all entrained air 152 between the first substrate 100 and second substrate 200. As such, the display article 10 may be robust, may have excellent display performance, and may include a minimal distance between the first substrate 100 and the second substrate 200. Further, the display article 10 may have a reduced reflection between the first substrate 100 and the second substrate 200, and a refractive incidence almost coincident to all layers of the display article 10. Further, since the method 12 is a consolidated and flexible process, the workpiece 14 and method 12 may be cost effective for producing the display article 10.

While the best modes for carrying out the disclosure have been described in detail, those familiar with the art to which this disclosure relates will recognize various alternative designs and embodiments for practicing the disclosure within the scope of the appended claims.

What is claimed is:

1. A workpiece for a display article, the workpiece comprising:
   a coated first substrate including:
      a first substrate;
      a liquid optically clear adhesive disposed on the first substrate in a first fill pattern that includes:
         a first chevron having a first vertex;
         a second chevron spaced apart from the first chevron and having a second vertex;
         a linear middle segment having a first midpoint and interconnecting the first vertex and the second vertex; and
         a central dot portion disposed at the first midpoint; and a dam disposed on the first substrate, spaced apart from the first fill pattern, and configured to restrain a flow of the liquid optically clear adhesive; and a coated second substrate adjacent the coated first substrate and including:
a second substrate; and
the liquid optically clear adhesive disposed on the second substrate in a second contact pattern that includes:
a third chevron including:
a first linear segment having a first end; and
a second linear segment having a second end and connected to the first linear segment at a third vertex;
a fourth chevron including:
a third linear segment having a third end; and
a fourth linear segment having a fourth end and connected to the third linear segment at a fourth vertex; and
a centerline portion having a second midpoint and interconnecting the third vertex and the fourth vertex.

2. The workpiece of claim 1, wherein the dam maintains a distance between the first substrate and the second substrate.

3. The workpiece of claim 1, wherein the first substrate has a top edge and a bottom edge spaced apart from the top edge, and wherein the first substrate is aligned with the second substrate along the top edge and the bottom edge.

4. The workpiece of claim 3, wherein the dam includes:
a first dam portion disposed along the top edge;
a second dam portion disposed along the top edge and spaced apart from the first dam portion to define a first gap therebetween;
a third dam portion disposed along the top edge and spaced apart from the second dam portion to define a second gap therebetween;
a fourth dam portion disposed along the top edge and spaced apart from the third dam portion to define a third gap therebetween;
a fifth dam portion disposed along the bottom edge and spaced opposite the first dam portion;
a sixth dam portion disposed along the bottom edge, spaced opposite the second dam portion, and spaced apart from the fifth dam portion to define a fourth gap therebetween;
a seventh dam portion disposed along the bottom edge, spaced opposite the third dam portion, and spaced apart from the sixth dam portion to define a fifth gap therebetween; and
an eighth dam portion disposed along the bottom edge, spaced opposite the fourth dam portion, and spaced apart from the seventh dam portion to define a sixth gap therebetween.

5. The workpiece of claim 4, wherein:
the first gap has a first gap width;
the third gap has a third gap width that is equal to the first gap width;
the second gap has a second gap width that is less than the first gap width;
the fourth gap has a fourth gap width;
the sixth gap has a sixth gap width that is equal to the fourth gap width;
the fifth gap has a fifth gap width that is less than the fourth gap width;
the first gap width is equal to the fourth gap width;
the second gap width is equal to the fifth gap width; and the first dam portion, the second dam portion, the third dam portion, the fourth dam portion, the fifth dam portion, the sixth dam portion, the seventh dam portion, and the eighth dam portion have an equal length.

6. The workpiece of claim 1, wherein the dam is formed from a curable material.

7. The workpiece of claim 1, wherein the coated second substrate further includes:
a first dot portion disposed at the first end;
a second dot portion disposed at the second end;
a third dot portion disposed at the third end;
a fourth dot portion disposed at the fourth end;
a fifth dot portion disposed at the third vertex;
a sixth dot portion disposed at the fourth vertex; and
a middle dot portion disposed at the second midpoint.

8. The workpiece of claim 7, wherein:
the first chevron has a first width;
the second chevron has a second width that is equal to the first width;
the linear middle segment has a third width that is equal to the first width and the second width; and
the central dot portion has a diameter that is greater than the third width.

9. The workpiece of claim 8, wherein:
the first chevron has a first height;
the second chevron has a second height that is equal to the first height;
the linear middle segment has a third height that is greater than the first height;
the central dot portion has a fourth height that is greater than the third height;
the third chevron has a third height at the third vertex;
the fourth chevron has a fourth height at the fourth vertex that is equal to the third height;
the centerline portion has a fifth height that is equal to the third height and the fourth height; and
each of the first dot portion, the second dot portion, the third dot portion, the fourth dot portion, the fifth dot portion, the sixth dot portion, and the middle dot portion has a dot height that is greater than the fifth height.

10. The workpiece of claim 1, wherein the first chevron is aligned with the third chevron.

11. The workpiece of claim 1, wherein the linear middle segment is aligned with the centerline portion.

12. The workpiece of claim 1, wherein the second chevron is aligned with the fourth chevron.

13. The workpiece of claim 1, wherein the third chevron and the fourth chevron each has a top and a bottom, and further wherein the second contact pattern is graduated in height and is taller at the second midpoint, the third vertex, the fourth vertex, the top of the third chevron, the bottom of the third chevron, the top of the fourth chevron, and the bottom of the fourth chevron than at the centerline portion.

14. The workpiece of claim 1, wherein the second contact pattern mirrors the first fill pattern.

15. The workpiece of claim 1, wherein the second contact pattern is formed from a first quantity of the liquid optically clear adhesive and the first fill pattern is formed from a second quantity of the liquid optically clear adhesive that is greater than the first quantity.

16. The workpiece of claim 1, wherein the first substrate has a first thickness and the second substrate has a second thickness that is different from the first thickness; and
wherein the liquid optically clear adhesive disposed in the first fill pattern is configured to merge with the liquid optically clear adhesive disposed in the second contact pattern, spread evenly, and compensate for the difference between the first thickness and the second thickness.

17. The workpiece of claim 1, wherein the workpiece has a middle portion and an edge portion spaced apart from the middle portion, and wherein a thickness of the liquid optically clear adhesive is the same at the middle portion and the edge portion.

18. A workpiece comprising:
a plurality of coated first substrates, wherein each of the plurality of coated first substrates includes:
  a first substrate;
  a liquid optically clear adhesive disposed on the first substrate in a first fill pattern that includes:
    a first chevron having a first vertex;
    a second chevron spaced apart from the first chevron and having a second vertex;
    a linear middle segment having a first midpoint and interconnecting the first vertex and the second vertex; and
    a central dot portion disposed at the first midpoint; and
  a dam disposed on the first substrate, spaced apart from the first fill pattern, and configured to restrain a flow of the liquid optically clear adhesive; and
a plurality of coated second substrates, wherein each of the plurality of coated second substrates includes:
  a second substrate; and
  the liquid optically clear adhesive disposed on the second substrate in a second contact pattern that includes:
    a third chevron including:
      a first linear segment having a first end; and
      a second linear segment having a second end and connected to the first linear segment at a third vertex;
    a fourth chevron including:
      a third linear segment having a third end; and
      a fourth linear segment having a fourth end and connected to the third linear segment at a fourth vertex; and
    a centerline portion having a second midpoint and interconnecting the third vertex and the fourth vertex;
  wherein two of the plurality of coated first substrates are disposed in alternating arrangement with two of the plurality of coated second substrates.

19. The workpiece of claim 18, wherein the first substrate has a top edge and a bottom edge spaced apart from the top edge; and
further wherein the dam includes:
  a first dam portion disposed along the top edge;
  a second dam portion disposed along the top edge and spaced apart from the first dam portion to define a first gap therebetween;
  a third dam portion disposed along the top edge and spaced apart from the second dam portion to define a second gap therebetween;
  a fourth dam portion disposed along the top edge and spaced apart from the third dam portion to define a third gap therebetween;
  a fifth dam portion disposed along the bottom edge and spaced opposite the first dam portion;
  a sixth dam portion disposed along the bottom edge, spaced opposite the second dam portion, and spaced apart from the fifth dam portion to define a fourth gap therebetween;
  a seventh dam portion disposed along the bottom edge, spaced opposite the third dam portion, and spaced apart from the sixth dam portion to define a fifth gap therebetween; and
  an eighth dam portion disposed along the bottom edge, spaced opposite the fourth dam portion, and spaced apart from the seventh dam portion to define a sixth gap therebetween.

20. A display article including the workpiece of claim 18, wherein the plurality of coated first substrates are bonded to the plurality of coated second substrates with the liquid optically clear adhesive.

* * * * *